United States Patent [19]

Wright

[11] Patent Number: 5,205,614

[45] Date of Patent: * Apr. 27, 1993

[54] WHEEL TRIM ATTACHMENT SYSTEM USING STUD EXTENDERS

[76] Inventor: James P. Wright, 1060 Robin La., Cookeville, Tenn. 38501

[*] Notice: The portion of the term of this patent subsequent to Jun. 12, 2007 has been disclaimed.

[21] Appl. No.: 851,488

[22] Filed: Mar. 13, 1992

Related U.S. Application Data

[63] Continuation of Ser. No. 602,127, Oct. 23, 1990, abandoned.

[51] Int. Cl.⁵ .................................................. B60B 7/14
[52] U.S. Cl. ................................ 301/37.37; 301/37.1
[58] Field of Search ............ 301/9 DN, 37 R, 37 S, 301/108 R, 108 S

[56] References Cited

U.S. PATENT DOCUMENTS 3,092,420  6/1963  Baldwin et al. ............... 301/37 SC
4,165,904  8/1979  Reppert ........................... 301/9 DN
4,240,670  12/1980  Zorn et al. ...................... 301/9 DN
4,632,465  12/1986  Cummings ....................... 301/108 S
4,932,724  6/1990  Wright ............................. 301/37 S

FOREIGN PATENT DOCUMENTS 622482  5/1927  France ............................. 301/108 S Primary Examiner—Russell D. Stormer
Attorney, Agent, or Firm—Edward D. Lanquist, Jr.; Mark J. Patterson; I. C. Waddey, Jr.

[57] ABSTRACT

A wheel trim attachment system using stud extenders for attachment to either a front or rear wheel of a motor vehicle. The device is designed such that the same stud extender can be used for the front wheel as can be used for the rear wheel. The stud extenders allow attachment of the decorative trim member without removal of an existing lug. One embodiment of the trim member allows for attachment of a stud extender even where there are insufficient threads on a wheel stud above a wheel lug.

8 Claims, 4 Drawing Sheets

WHEEL TRIM ATTACHMENT SYSTEM USING STUD EXTENDERS

This is a continuation of U.S. patent application Ser. No. 602,127 filed on Oct. 23, 1990 for "Wheel Trim Attachment System Using Stud Extenders" now abandoned.

BACKGROUND OF THE INVENTION

The present invention relates generally to a mechanism for attaching a decorative wheel trim to a motor vehicle wheel and more particularly to a wheel trim attachment system using stud extenders to attach a decorative wheel trim member to either a front or rear wheel without the removal of the existing lug nuts.

It will be appreciated by those skilled in the art that vehicle owners desire a decorative wheel trim member that covers the existing motor vehicle wheel. Further, those skilled in the art will appreciate the fact that during inspection, the Department of Transportation requires that the conventional wheel of a truck covered by a wheel trim member be examined without having to jack the truck off the ground and remove the existing wheel lug nuts. It will be further appreciated by those skilled in the art that the Ford Motor Company and other motor vehicle manufacturers are requiring that wheel trim attachment members be placed on the existing wheel without removal of the lug nuts to improve safety. It will be further appreciated by those skilled in the art that the method of attachment must be the same for either a rear or front wheel. Also, it will be appreciated by those skilled in the art that on certain conventional wheels, there may be as little as one thread exposed on the existing wheel stud above the wheel lug nut. To this end, there have been several attempts to provide a method of attachment of a wheel trim member.

Canadian patent No. 1,160,262, issued to Ladoceur, and U.S. Pat. No. 3,833,266, issued to Lamme, disclose the use of jam nuts as a means of attaching a wheel trim member to the existing wheel studs without the removal of the wheel nuts. However, this method of attachment can be used only when a low profile on the wheel trim member is desired. Ladoceur does not teach direct attachment to an existing stud and does not teach direct attachment if the existing stud does not have sufficient threads.

U.S. Pat. No. 4,632,465, issued to Cummings, discloses the use of a stud extender to be placed over each of the existing wheel studs. However, the application of Cummings is limited to the rear or drive wheel, because of the length of the stud extender. Cummings cannot be used on a front or leading wheel without the use of a stud extender of a different length and, in fact, calls for the removal of the original wheel lug nuts to attach the front wheel trim member. Cummings teaches neither direct attachment of a trim member by use of a jam nut nor use of a stud.

What is needed, then, is a wheel trim attachment member system that can be installed on either the front or rear wheel. Additionally, the wheel trim member must be attachable and removable without the removal of the existing wheel lugs. This wheel trim attachment member must be usable on a wheel having either an even or odd number of lugs. This wheel trim attachment member must be able to attach to an existing wheel stud even when very few threads are exposed above the conventional wheel lug. This access is presently lacking in the prior art.

SUMMARY OF THE INVENTION

In the present device, a wheel trim attachment member is provided for attachment to either a front or rear wheel. If the wheel has an even number of studs, opposing wheel studs are placed through holes provided in the wheel trim member. If insufficient threads are available, stud extenders can be used. In the preferred embodiment, the decorative wheel trim member is concave toward the original wheel for attachment to the rear wheel, except it is convex to cover the hub, and outwardly convex for attachment to the front or leading wheel because of the profiles desired by the public.

If the conventional wheel has an odd number of lugs, a bridge bracket having holes through it is placed over adjacent lugs and attached to the adjacent lug with additional jam nuts. A bridge bracket stud is placed on the bridge bracket equidistant between the adjacent wheel studs. The bridge bracket is the same thickness as the basal mounting plate of one version of the extender. A stud extender can be placed on the bridge bracket stud. Another stud extender can be placed on the wheel stud opposite the bridge bracket stud. The same type of decorative wheel trim attachment is placed over the stud extenders or the exposed studs. Holes are placed in the decorative wheel trim member to receive the stud extenders or the studs. Jam nuts are used to attach the wheel trim to the stud or stud extender.

The stud extender can be a standard stud extender, a stud extender with a basal mounting plate, and a stud extender that uses set screws.

Accordingly, an object of the present invention is to provide a decorative wheel trim member that can be attached using the same stud extender for a front rear or a rear wheel.

Another object of the present invention is to provide a system that allows the attachment of a decorative wheel trim member without the removal of any existing wheel lugs.

Still another object of the present invention is to provide a wheel trim member that can be attached to a wheel having either an odd or even number of studs.

Still a further object of the present invention is to provide a wheel trim attachment system that can be used even though there are very few threads exposed above the existing wheel studs.

DESCRIPTION OF THE PREFERRED EMBODIMENT

Figure 1:
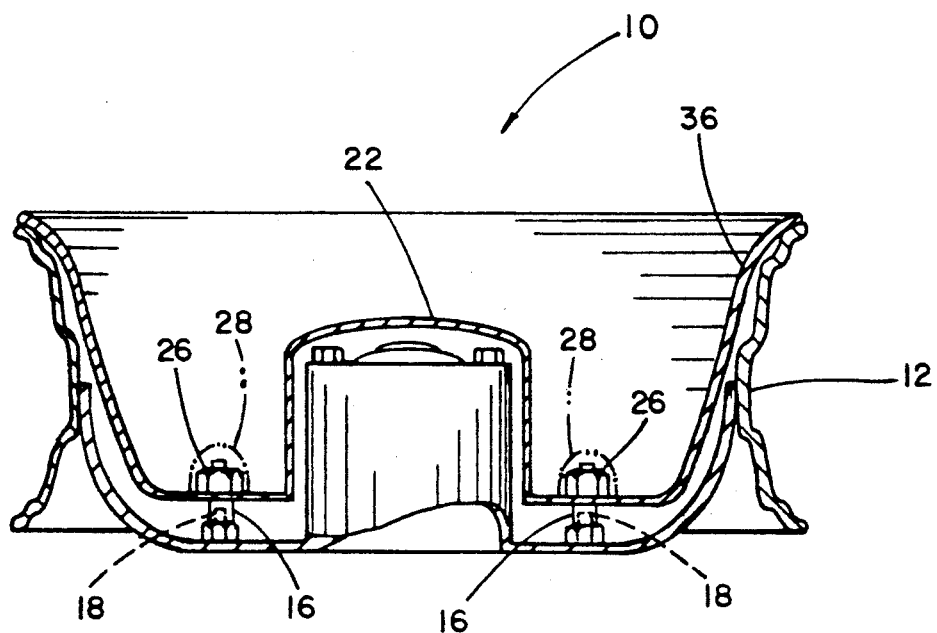
FIG. 1 is a cutaway view of the wheel trim attachment system using jam nut and stud extender attachment to a rear wheel.
Figure 7:
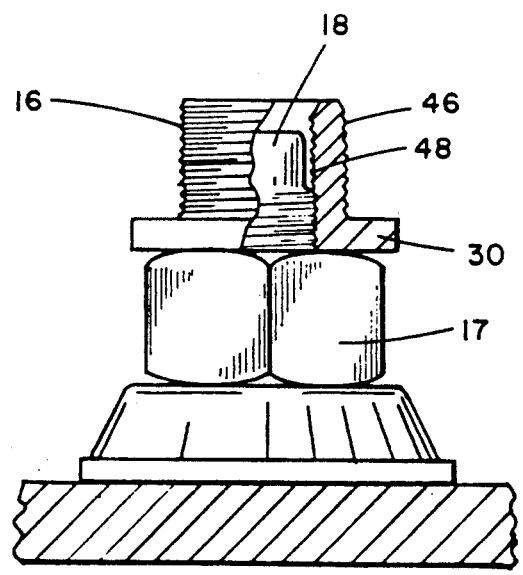
FIG. 7 is a plan view showing a stud extender with a basal mounting plate.
Figure 8:
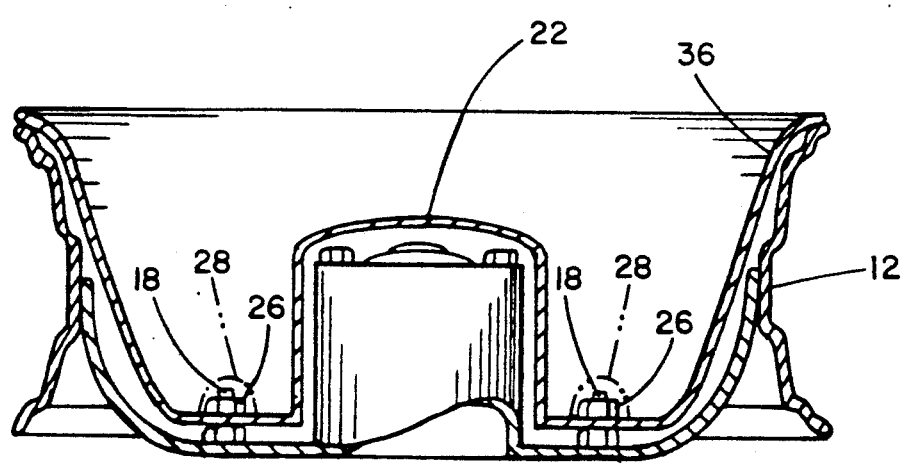
FIG. 8 is a cutaway view of the wheel trim attachment system using jam nut attachment to a rear wheel.

Referring now to FIGS. 1 and 8, there is shown generally at 10 the wheel trim attachment system using stud extenders. FIG. 1 shows the device for attachment of a decorative wheel trim member 36 to rear wheel 12. Generally, in the preferred embodiment, rear trim member 36 is concave toward wheel 12, except that hub cover 22 is convex to demonstrate the general shape of hub 20. Front trim member 37 is convex, along with hub cover 22. Stud extenders (16 in FIGS. 5, 6, 7) are placed over two opposing wheel studs 18 when studs 18 have insufficient threads for jam nuts 26. Trim member 36 includes holes 38 to receive stud extenders 16. Jam nuts 26 are placed over stud extenders 16 to hold trim member 36 in place. Decorative lug covers 28 (in phantom) can be snapped over jam nuts 26 to provide a consistent aesthetic appearance.

Figure 2:
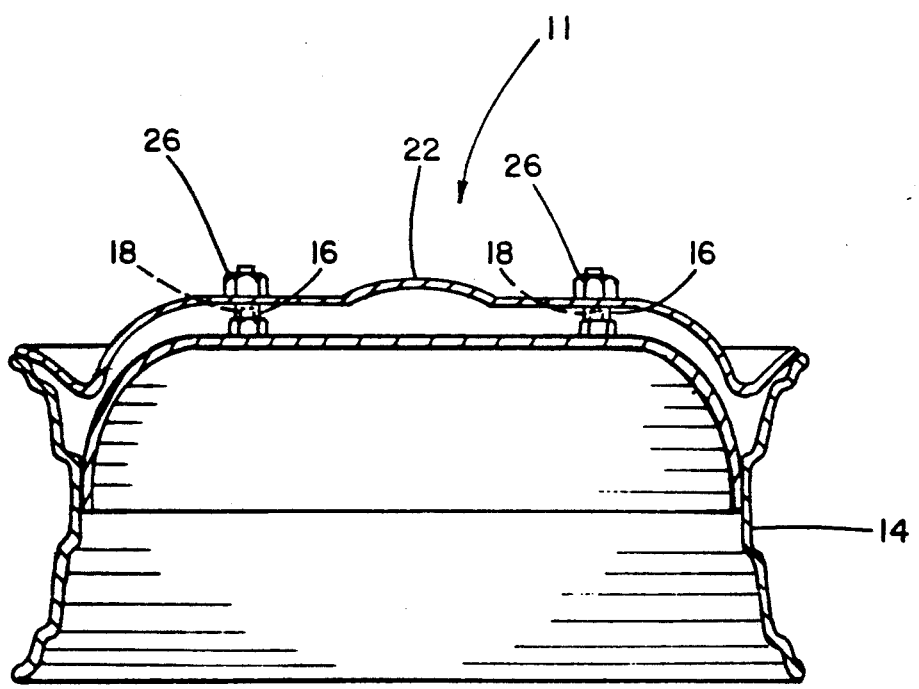
FIG. 2 is a cutaway view of the wheel trim attachment system using jam nut attachment to a front wheel.

Referring now generally to FIG. 2, there is shown generally at 11 the wheel trim attachment system as it is attached to front wheel 14. Because trim member 36 is generally outwardly convex, the same stud extender 16 used in front wheel 14 attachment can be used in rear wheel 12 attachment (if necessary). Stud extender 16 fastens to wheel stud 18 if stud 18 has insufficient threads for nut 26. Jam nuts 26 attach trim member 36 to front wheel 14. Lug covers (28 in FIG. 1) can be attached to jam nuts 26. Hub cover 22 can be placed on front trim member 11.

Figure 3:
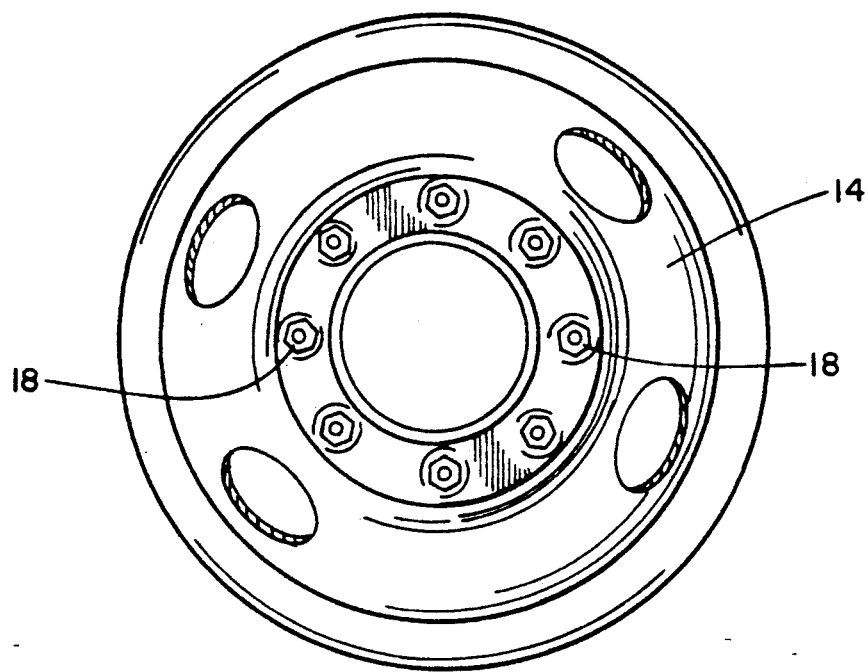
FIG. 3 is a plan view showing a method of attachment of the stud extenders to a conventional wheel having an even number of studs.

Referring now generally to FIG. 3, there is shown at 14 a plan view of a front wheel 14 having an even number of wheel studs 18 Stud extenders (16 in FIG. 1) can be placed at opposing wheel studs 18.

Figure 4:
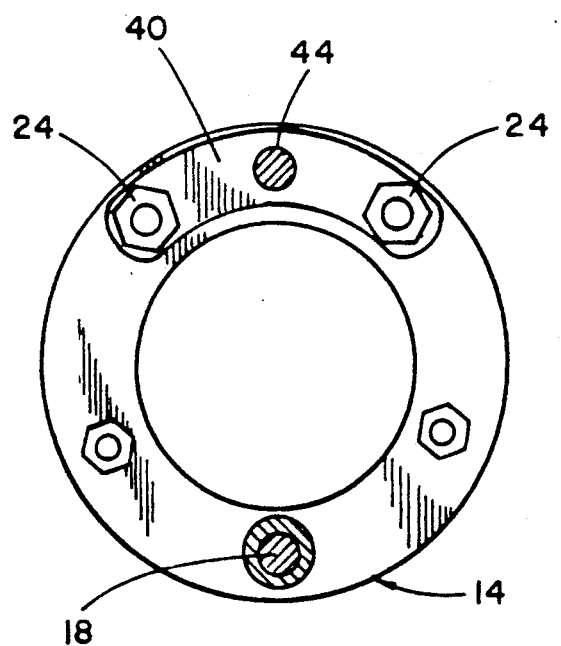
FIG. 4 is a plan view showing a wheel trim attachment system using a bridge bracket for attachment to a conventional wheel having an odd number of wheel studs.

FIG. 4 shows generally front wheel 14 having an odd number of studs 18. Refering to FIGS. 4 and 9, bridge bracket 40 is placed over adjacent wheel studs 18. Holes are placed through bridge bracket 40 to receive wheel studs 18. Bridge bracket stud 44 is placed equidistant between holes 42. Bridge bracket 40 is attached to adjacent studs 18 by jam nuts 26. Stud extenders (16 in FIGS. 6, 7, 8) can be placed over bridge bracket stud 44 and wheel stud 18 opposite bridge bracket stud 44 to raise the plane of attachment of trim member (36 in FIGS. 1 and 2). The two stud extenders 16 then become opposite one another on wheel 14.

Figure 5:
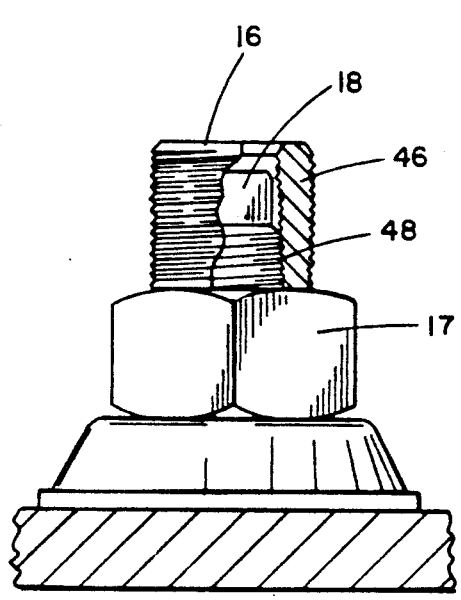
FIG. 5 is a side view showing a stud extender.

FIG. 5 shows a side view of stud extender 16. Stud extender 16 has external threads that are received by jam nuts (26 in FIG. 1). Stud extender 16 also has internal threads 48 that receive wheel stud 18. This type of stud extender 16 is used to provide sufficient threads above trim member 36 for jam nut 26.

Figure 6:
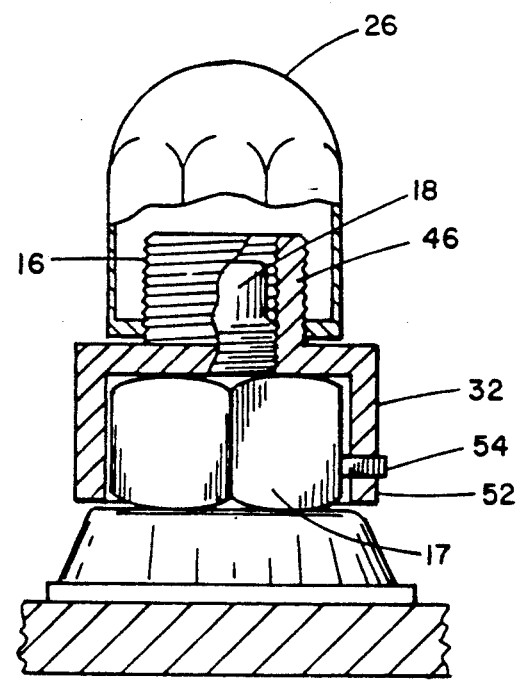
FIG. 6 is a side view of a stud extender using set screws to hold the stud extender in place.

FIG. 6 shows stud extender 16 with collar 32. This type of stud extender 16 is used primarily where the threads above wheel stud 18 are insufficient to provide adequate mounting for jam nut 26. Collar 32 envelopes wheel lug 17. Collar 32 includes holes 52 to receive anti-rotation or set screws 54 that hold stud extender 16 in place. Collar 32 can have internal threads to receive stud 18.

FIG. 7 shows stud extender 16 with basal mounting plate 30. Basal mounting plate 30 allows a plane for attachment of wheel trim member (36 in FIG. 1) above wheel lug 17. In other words, basal mounting plate 30 can be screwed over wheel stud 18 partially without making contact to wheel lug 17 and still provide a sturdy plane for attachment of wheel trim member 36. Basal mounting plate 30 provides a more secure support.

In the preferred embodiment, opposite stud extenders 16 are used to provide better attachment of trim member 36 to wheel 12, 14. Two points of attachment are sufficient, as long as those points are opposite. If stud extenders 16 are not opposite, trim member 36 is less secure and may either come off or rattle excessively In viewing FIGS. 1 and 3 in combination, another embodiment of the present invention is shown. In certain instances, stud 18 of wheel 12 (or 14 in FIG. 2) is sufficiently long enough so that stud extender 16 is not required. In this instance, holes 38 of trim member 36 are placed directly over stud 18. Jam nut 26 is placed over stud 18 to hold wheel trim in place. Also, if stud 18 has insufficient threads to engage jam nut 26, stud extender 16 in FIG. 6 can be used such that collar 32 can envelop lug 17. Set screws 54 then hold collar 32 in place.

Truck wheels are either singly mounted or doubly mounted. One of the benefits of the present invention is that different types of wheel trim members can be used for different types of wheels. For example, for a double-mounted wheel, the front or rear wheel can either be inwardly concave or outwardly convex in any combination. Further, for a singly mounted wheel, the trim member can either be inwardly concave or outwardly convex or any combination thereof.

Thus, although there have been described particular embodiments of the present invention of a new and useful wheel trim attachment system using stud extenders, it is not intended that such references be construed as limitations upon the scope of this invention, except as set forth in the following claims.

What I claim is:

1. A system for attaching decorative wheel trim to a wheel of a motor vehicle having an odd number of wheel studs including a first stud and two adjacent studs opposite said first stud, said wheel studs having corresponding lug nuts that need not be removed for attaching said decorative wheel trim to said wheel, said system comprising:
    (a) a bridge bracket having holes to receive said adjacent said wheel studs, said bridge bracket comprising a bracket stud placed equidistant between said adjacent wheel studs such that said bracket stud is opposite said first stud;
    (b) means for attaching said trim member to said bridge bracket stud; and
    (c) means for attaching said bridge bracket to said adjacent wheel studs.

2. The system of claim 1 further comprising:
    (a) stud extender attached to said first stud; and
    (b) said decorative wheel trim having two holes for receiving said stud extender and said bracket stud.

3. The system of claim 2 wherein said stud extender further comprises a basal mounting plate.

4. The system of claim 2 wherein said stud extender comprises:
    (a) a wheel lug cover for enveloping said wheel lugs;
    (b) said wheel lug cover including plural lug cover holes; and
    (c) a set screw placed in each of said lug cover holes in said wheel lug cover to hold said wheel cover against said wheel lug.

5. The system of claim 2 wherein said trim member is concave toward said wheel for use with a rear wheel.

6. The system of claim 2 wherein said trim member is outwardly convex for use with a front wheel.

7. The system of claim 5 wherein said stud extender has a basal mounting plate.

8. The wheel trim system of claim 2 wherein said stud extender comprises:
 (a) a collar for enveloping said wheel lugs;
 (b) said collar having a hole; and
 (c) a set screw placed in said hole in said collar.

* * * * *